(12) United States Patent
Oh et al.

(10) Patent No.: US 8,912,703 B2
(45) Date of Patent: Dec. 16, 2014

(54) STATOR CORE AND SPINDLE MOTOR INCLUDING THE SAME

(75) Inventors: Song Bon Oh, Gyunggi-do (KR); Jong Ryeol Oh, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 151 days.

(21) Appl. No.: 13/442,362

(22) Filed: Apr. 9, 2012

(65) Prior Publication Data

US 2013/0076196 A1 Mar. 28, 2013

(30) Foreign Application Priority Data

Sep. 22, 2011 (KR) .................. 10-2011-0095750

(51) Int. Cl.
| H02K 1/06 | (2006.01) |
| H02K 1/14 | (2006.01) |
| H02K 29/03 | (2006.01) |
| H02K 21/22 | (2006.01) |

(52) U.S. Cl.
CPC .............. *H02K 21/222* (2013.01); *H02K 1/146* (2013.01); *H02K 29/03* (2013.01)
USPC .............. 310/216.106; 310/216.094

(58) Field of Classification Search
CPC .......... H02K 29/03; H02K 1/146; H02K 1/14
USPC ............. 310/51, 216.093–216.094, 216.106, 310/216.001, 216.008
See application file for complete search history.

(56) References Cited

U.S. PATENT DOCUMENTS

| 1,803,493 | A | * | 5/1931 | Volet ............................ 310/265 |
| 4,583,015 | A | * | 4/1986 | Toshimitsu ................... 310/187 |
| 4,761,576 | A | * | 8/1988 | Savage .......................... 310/51 |
| 5,801,463 | A | * | 9/1998 | Suzuki et al. .................. 310/51 |
| 6,211,587 | B1 | * | 4/2001 | Enomoto et al. ............... 310/52 |
| 6,499,209 | B1 | * | 12/2002 | Landin et al. .................. 29/596 |
| 6,664,696 | B1 | * | 12/2003 | Pham et al. ............ 310/216.106 |
| 7,592,734 | B2 | * | 9/2009 | Enomoto et al. ....... 310/216.067 |
| 2004/0056557 | A1 | * | 3/2004 | Enomoto et al. .............. 310/218 |
| 2007/0046130 | A1 | * | 3/2007 | Enomoto et al. .............. 310/216 |

FOREIGN PATENT DOCUMENTS

| JP | 8-256461 | 10/1996 |
| JP | 11-355985 | 12/1999 |
| JP | 2001-16810 | 1/2001 |
| JP | 2003-61272 | 2/2003 |
| JP | 2003-319575 | 11/2003 |
| JP | 2007-60800 | 3/2007 |
| JP | 2010-172063 | 8/2010 |
| KR | 10-2011-0009876 A | 1/2011 |
| KR | 10-2011-0087230 A | 8/2011 |

OTHER PUBLICATIONS

Korean Office Action issued Aug. 19, 2014 in corresponding Korean Patent Application No. 10-2011-0095750.
Japanese Office Action issued Aug. 12, 2014 in corresponding Japanese Patent Application No. 2012-089915.

* cited by examiner

*Primary Examiner* — Thanh Lam (57) ABSTRACT

There is provided a stator core formed by stacking a plurality of single core sheets, each including a coreback having a central hole formed therein, a plurality of tooth parts extended from the coreback in a radial direction, and extension parts extended from the plurality of respective tooth parts in a circumferential direction, wherein at least one of the plurality of single core sheets includes through-holes formed therein in order to reduce cogging torque, the through-holes being formed in the extension parts.

9 Claims, 6 Drawing Sheets

STATOR CORE AND SPINDLE MOTOR INCLUDING THE SAME

CROSS-REFERENCE TO RELATED APPLICATIONS

This application claims the priority of Korean Patent Application No. 10-2011-0095750 filed on Sep. 22, 2011, in the Korean Intellectual Property Office, the disclosure of which is incorporated herein by reference.

BACKGROUND OF THE INVENTION

1. Field of the Invention

The present invention relates to a stator core and a spindle motor including the same, and more particularly, to a stator core having a coil wound therearound and a spindle motor including the same.

2. Description of the Related Art

Generally, a small sized spindle motor used in a hard disk drive (HDD) may be configured of a rotor and a stator.

Meanwhile, the rotor, a rotating member rotating while being supported by the stator, may include a rotor hub having a magnet installed thereon.

In addition, the stator, a fixed member rotatably supporting the rotor, may include a stator core disposed to face the magnet.

Further, the stator core included in the stator includes a coil wound therearound, the coil having power supplied thereto from the outside.

Further, the rotor hub may rotate through electromagnetic interaction between the magnet and the stator core around which the coil is wound. That is, when power is supplied to the coil, the rotor hub rotates through electromagnetic interaction between the stator core and the magnet.

Figure 1:
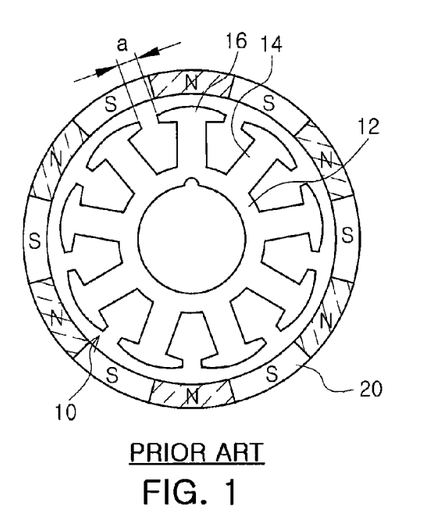
FIGS. 1 and 2 are plan views respectively showing a stator core according to the related art.

In addition, as shown in FIG. 1, the stator core 10 may include a ring shaped coreback 12, tooth parts 14 extended from the coreback 12, and extension parts 16 formed at distal end portions of the tooth parts 14 and extended in a radial direction so as to increase an area facing the magnet 20.

Meanwhile, the extension parts 16 of the stator core 10 are disposed to be spaced apart from each other by predetermined intervals, such that opened areas "a" are formed between the extension parts 16.

However, when the magnet 20 installed on the rotor hub rotates together therewith, a magnitude of magnetic flux distribution changes due to the extension parts 16 and the opened areas "a" formed between the extension parts 16, and cogging torque is generated by a change in an amount of magnetic flux.

Therefore, vibrations and noise are generated at the time of rotation of the rotor hub.

Figure 2:
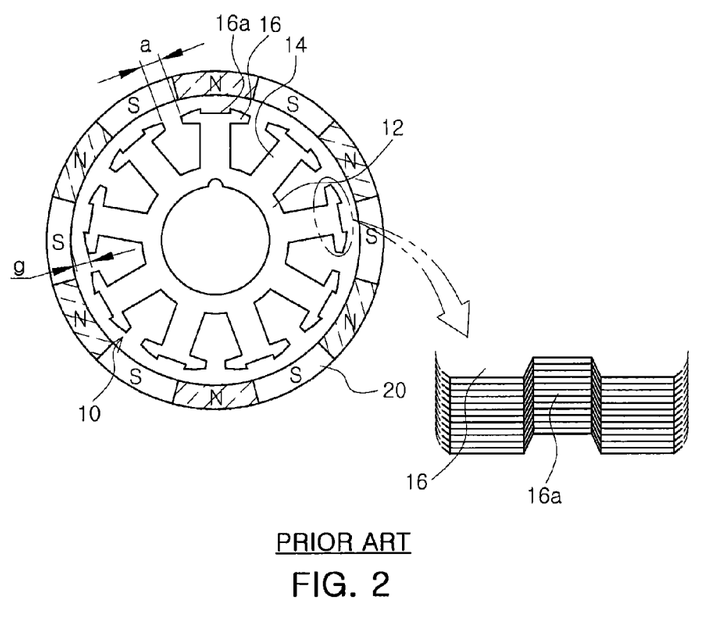

Meanwhile, in order to reduce cogging torque causing these vibrations and noise, a technique of forming grooves 16a in front edges of the extension parts 16 as shown in FIG. 2 has been developed. However, in this case, gaps "g" between the front edges of the extension parts 16 and an inner surface of the magnet 20 are not constant, such that an irregular airflow occurs at the time of the rotation of the rotor hub.

Therefore, noise such as a whistling sound, or the like, may be additionally generated.

SUMMARY OF THE INVENTION

An aspect of the present invention provides a stator core capable of reducing cogging torque, and a spindle motor including the same.

Another aspect of the present invention provides a stator core capable of reducing generation of noise and vibrations, and a spindle motor including the same.

According to an aspect of the present invention, there is provided a stator core formed by stacking a plurality of single core sheets, each including a coreback having a central hole formed therein, a plurality of tooth parts extended from the coreback in a radial direction, and extension parts extended from the plurality of respective tooth parts in a circumferential direction, wherein at least one of the plurality of single core sheets includes through-holes formed therein in order to reduce cogging torque, the through-holes being formed in the extension parts.

Among the plurality of single core sheets, an uppermost single core sheet may close the through-holes formed in the remainder single core sheets stacked therebelow.

The through-holes may be formed in all of the plurality of single core sheets and be closed by a filler.

The through-holes may be formed in an axial direction in order to reduce cogging torque.

Each through-hole may have a circular shape, and a ratio of a diameter of each through-hole to an interval between the extension parts may be within a range of 0.5~1:1.

According to another aspect of the present invention, there is provided a spindle motor including: a rotor part including a rotor hub having a magnet mounted on an inner surface thereof; and stator part rotatably supporting the rotor part and including a stator core disposed to face the magnet, herein the stator core is formed by stacking a plurality of single core sheets, each including a coreback having a central hole formed therein, a plurality of tooth parts extended from the coreback in a radial direction, and extension parts extended from the plurality of respective tooth parts in a circumferential direction, and at least one of the plurality of single core sheets includes through-holes formed therein in order to reduce cogging torque, the through-holes being formed in the extension parts.

The stator part may further include a base member including an installing part having the stator core mounted thereon; and a sleeve fixed to the installing part, and the stator core may be fixed to an outer peripheral surface of the installing part in order that front edges of the extension parts are disposed to face the magnet.

The rotor part may further include a shaft rotatably inserted into the sleeve and having the rotor hub mounted on an upper end portion thereof to thereby rotate together therewith, and the through-hole may be formed to be parallel with the shaft.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, when it is determined that the detailed description of the known art related to the present invention may obscure the gist of the present invention, the detailed description thereof will be omitted.

Figure 3:
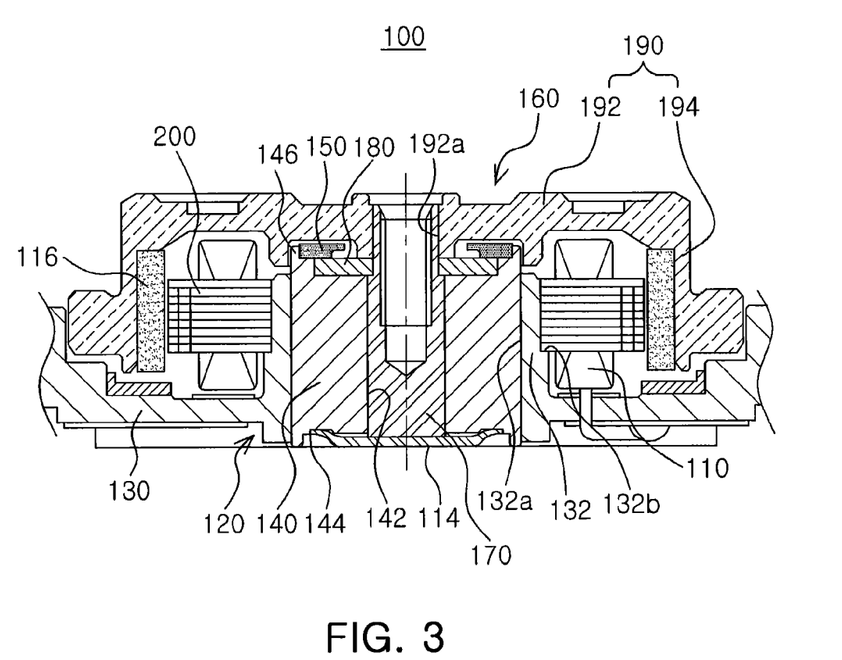
FIG. 3 is a schematic cross-sectional view showing a spindle motor according to an embodiment of the present invention.

FIG. 3 is a schematic cross-sectional view showing a spindle motor according to an embodiment of the present invention.

Referring to FIG. 3, the spindle motor 100 according to the embodiment of the present invention may include a stator part 120 and a rotor part 160 by way of example.

The stator part 120 may rotatably support the rotor part 160. Meanwhile, the stator part 120 may include a base member 130, a sleeve 140, and a stator core 200.

First, the base member 130 may include an installing part 132 having the sleeve 140 inserted therein. In addition, the installing part 132 may include an installing hole 132a formed so as to allow the sleeve 140 to be inserted therein.

That is, the sleeve 140 may be inserted into the installing hole 132a to be fixed thereto.

Meanwhile, the installing part 132 may include a step part 132b provided on an outer peripheral surface thereof so that the stator core 200 is mounted thereon. That is, the stator core 132 may be fixed to the installing part 132 while being mounted on the step part 132b provided on the outer peripheral surface of the installing part 132.

The sleeve 140 may be fixed to the installing part 132, and have a hollow cylindrical shape in order that an insertion hole 142 is formed at the center thereof.

In addition, the sleeve 140 may include a cover member 114 installed on a lower end portion thereof in order to prevent leakage of lubricating fluid. To this end, the sleeve 140 may include a recessed part 144 formed in a lower surface thereof. That is, the cover member 114 may be fixed into the recessed part 144.

In addition, the sleeve 140 may include an outer wall part 146 provided at an upper end portion thereof so as to install a cap member 150 thereon. Meanwhile, the cap member 150 may serve to form an interface between the lubricating fluid and air together with the rotor part 160. The detailed description thereof will be provided below.

The rotor part 160 may include a rotor hub 190 having a magnet 116 mounted on an inner surface thereof. Meanwhile, the rotor part 160 may include a shaft 170, a thrust plate 180, and the rotor hub 190.

Here, terms with respect to directions will be defined. As viewed in FIG. 1, an axial direction refers to a vertical direction, that is, a direction from a lower portion of the shaft 170 toward an upper portion thereof or a direction from the upper portion of the shaft 170 toward the lower portion thereof. In addition, as viewed in FIG. 1, a radial direction refers to a horizontal direction, that is, a direction from an outer peripheral surface of the rotor hub 190 toward the shaft 170 or a direction from the shaft 170 toward the outer peripheral surface of the rotor hub 190, and a circumferential direction refers to a rotation direction along the outer peripheral surface of the rotor hub 190.

The shaft 170 may be rotatably inserted into the sleeve 140. That is, the shaft 170 may be inserted into the insertion hole 142 of the sleeve 140. Here, an outer peripheral surface of the shaft 170 and an inner peripheral surface of the sleeve 140 are disposed to be spaced apart from each other by a predetermined interval to thereby form a bearing clearance.

In addition, the bearing clearance may be filled with the lubricating fluid so as to generate fluid dynamic pressure at the time of rotation of the shaft 170.

Meanwhile, a dynamic pressure groove (not shown) pumping the lubricating fluid at the time of the rotation of the shaft 170 to thereby generate fluid dynamic pressure may be formed in at least one of the outer peripheral surface of the shaft 170 and the inner peripheral surface of the sleeve 140.

That is, due to the dynamic pressure groove at the time of the rotation of the shaft 170, the fluid dynamic pressure supporting the shaft 170 is generated, whereby the shaft 170 may rotate more stably.

The thrust plate 180 may be fixed to the shaft 170 and rotate together with the shaft 170 at the time of the rotation of the shaft 170. Further, the thrust plate 180 may be installed to face an upper surface of the sleeve 140.

Meanwhile, an interface between the lubricating fluid and air may be formed by a lower surface of the cap member 150 and an upper surface of the thrust plate 180. To this end, the cap member 150 may have an inclined surface formed at a distal end portion of the lower surface thereof.

The rotor hub 190 is fixedly coupled to an upper end portion of the shaft 170 to thereby rotate together with the shaft 170.

Meanwhile, the rotor hub 190 may include a disk-shaped rotor hub body 192 having an mounting hole 192a formed therein, the mounting hole 192a having the shaft 170 penetrating therethrough, and a magnet installation part 194 extended downwardly from an edge of the rotor hub body 192 in the axial direction.

Further, the magnet installation part 194 may include the magnet 116 fixed to an inner peripheral surface thereof. That is, the magnet 116 may be fixed to the inner peripheral surface of the magnet installation part 194 so as to be disposed to face a front end of the stator core 200.

In addition, the magnet 116 may have an annular ring shape and may be a permanent magnet generating magnetic force having a predetermined strength by alternately magnetizing an N pole and an S pole in the circumferential direction. That is, the magnet 116 may serve to generate driving force for rotating the rotor hub 190.

In other words, when power is applied to the coil 110 wound around the stator core 200, force capable of rotating the rotor hub 190 may be generated due to electromagnetic interaction between the stator core 200 having the coil 110 wound therearound and the magnet 116. Therefore, the rotor hub 190 may rotate.

As a result, through the rotation of the rotor hub 190, the shaft 170 and the thrust plate 180 installed on the shaft 170 may also rotate.

The stator core 200 may be fixed to an outer peripheral surface of the installing part 132. In addition, as described above, the stator core 200 may be disposed to face the magnet 116 to thereby generate driving force rotating the rotor hub 190 via electromagnetic interaction with the magnet 116.

A detailed description for the stator core 200 will be provided below with reference to the accompanying drawings.

Figure 4:
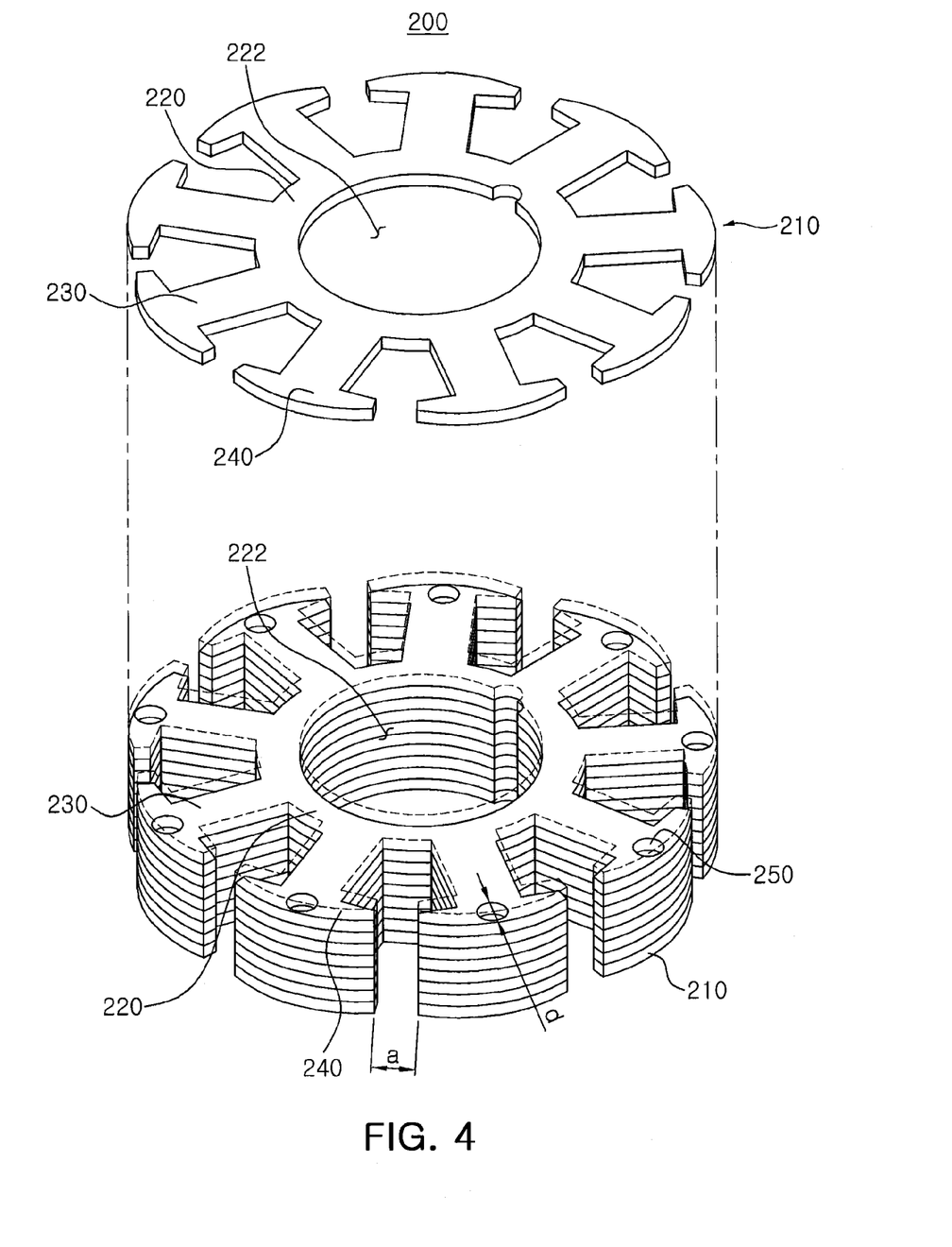
FIG. 4 is a perspective view showing a stator core according to the embodiment of the present invention.
Figure 5:
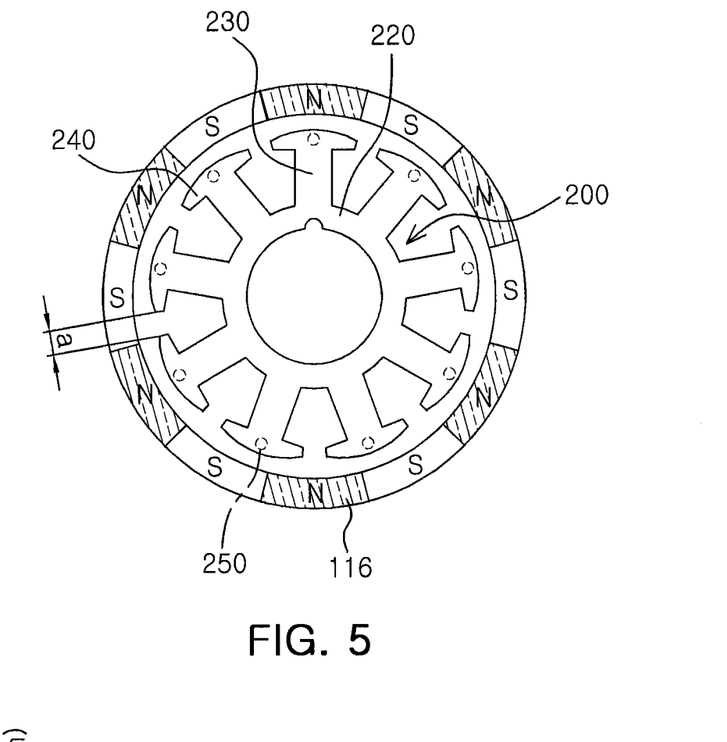
FIG. 5 is a plan view showing the stator core and a magnet according to the embodiment of the present invention.

FIG. 4 is a perspective view showing a stator core according to the embodiment of the present invention. FIG. 5 is a plan view showing the stator core and a magnet according to the embodiment of the present invention.

Referring to FIGS. 3 through 5, the stator core 200 according to the embodiment of the present invention may be formed by stacking a plurality of single core sheets 210, and at least one of the plurality of single core sheets 210 may includes through-holes 250 formed therein in order to reduce cogging torque.

Meanwhile, each of the single core sheets 210 may include a coreback 220, tooth parts 230, and extension parts 240.

The coreback 220 may have a ring shape in which a central hole 222 is formed such that the installing part 132 penetrates therethrough. That is, the coreback 220 may have a circular ring shape and be fixed to the outer peripheral surface of the installing part 132.

The tooth parts 230 may be extended from the coreback 220 in the radial direction and be provided in plural. That is, the plurality of tooth parts 230 may be extended in the radial direction so as to be spaced apart from one other in the circumferential direction.

Further, the extension parts 240 may be extended from the plurality of the respective tooth parts 230 in the circumferential direction.

In addition, the remainder single core sheets 210, except for the uppermost single core sheet 210 (the single core sheet 210 stacked on the uppermost portion among the plurality of single core sheets 210), may include the through-holes 250 formed in extension parts 240 thereof in order to reduce cogging torque.

In addition, each of the extension parts 240 may be disposed to be spaced apart from other extension parts 240 disposed adjacent thereto by predetermined intervals. In other words, the extension parts 240 may also be extended from each of the plurality of tooth parts 230 so as to be spaced apart from one another.

That is, each of the extension parts 240 extended from each of the plurality of tooth parts 230 may also be disposed to be spaced apart from one another by a predetermined interval "a" in the circumferential direction.

Meanwhile, the magnet 116 disposed to face front edges of the extension parts 240 may rotate together with the rotor hub 190 at the time of the rotation of the rotor hub 190. In this manner, when the rotor hub 190 rotates, a magnitude and a direction of magnetic flux distribution of the magnet 116, with the respect to the extension parts 240 are varied, such that cogging torque is generated by a change in an amount of magnetic flux in the front edges of the plurality of extension parts 240 and in spaces between the plurality of extension parts 240.

However, the stator core 200 according to the embodiment of the present invention includes the through-holes 250 formed in the extension parts 240 thereof, whereby cogging torque may be reduced.

Furthermore, since the through-holes 250 are not formed in the uppermost single core sheet 210, one sides of the through-holes 250 formed in the stator core 200 may be closed. Therefore, a flow of air passing through the through-holes 250 at the time of the rotation of the rotor hub 190 may be prevented, whereby noise and vibrations generated due to the air passing and flowing through the through-holes 250 may be reduced.

Meanwhile, the through-holes 250 may be formed in the axial direction so as to be in parallel with the shaft 170 in order to reduce cogging torque.

As an example, each through-hole 250 may have a circular cross section, and a ratio of a diameter "d" of the through-hole 250 to the interval "a" between the extension parts 240 may be 0.5~1:1.

The detailed description thereof will be provided below.

In addition, the through-holes 250 may be disposed on extension lines extended from the tooth parts 230 and be formed in the extension parts 240. That is, the through-holes 250 may be provided in the extension parts 240 to thereby reduce a change in a gap formed by an inner peripheral surface of the magnet 116 and the front edges of the extension parts 240.

Therefore, noise caused by an irregular air flow generated at the time of the rotation of the rotor hub 190 may be reduced. That is, a whistling sound caused by the irregular air flow generated at the time of the rotation of the rotor hub 190 may be reduced.

As described above, noise and vibrations generated due to the air flowing and passing through the through-holes 250 may be reduced while cogging torque is reduced by the stator core 200 including the through-holes 250 formed therein and having one closed sides.

Hereinafter, effects of the stator core according to the embodiment of the present invention will be described with reference to the accompanying drawings.

Figure 6:
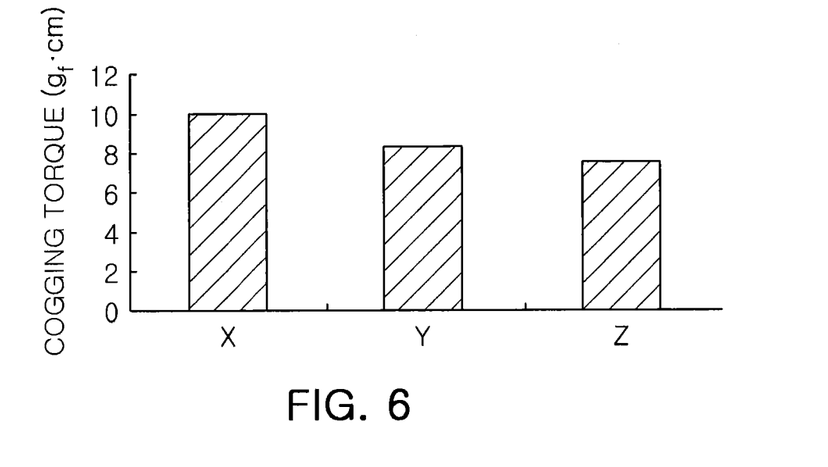
FIG. 6 is a graph comparing cogging torque of the stator core according to the embodiment of the present invention with cogging torque of the stator cores according to the related art.

FIG. 6 is a graph comparing cogging torque of the stator core according to the embodiment of the present invention with cogging torque of the stator cores according to the related art.

Figure 7:
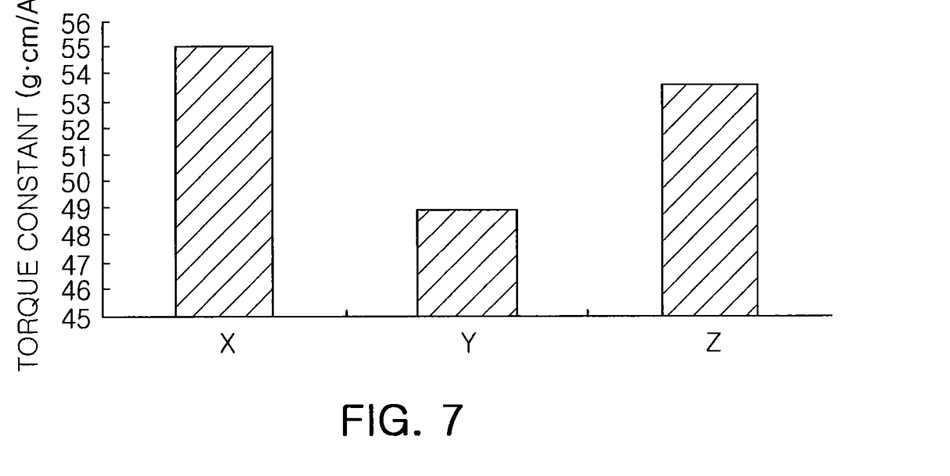
FIG. 7 is a graph comparing a torque constant of the stator core according to the embodiment of the present invention with torque constants of the stator cores according to the related art.
Figure 8:
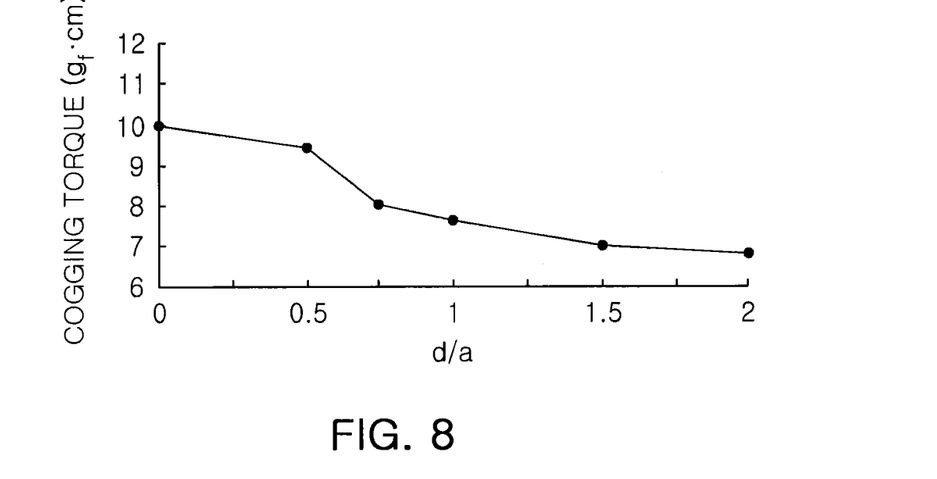
FIG. 8 is a graph describing a change in cogging torque according to a ratio between a diameter of a through-hole included in the stator core according to the embodiment of the present invention and an interval between extension parts of the stator core.
Figure 9:
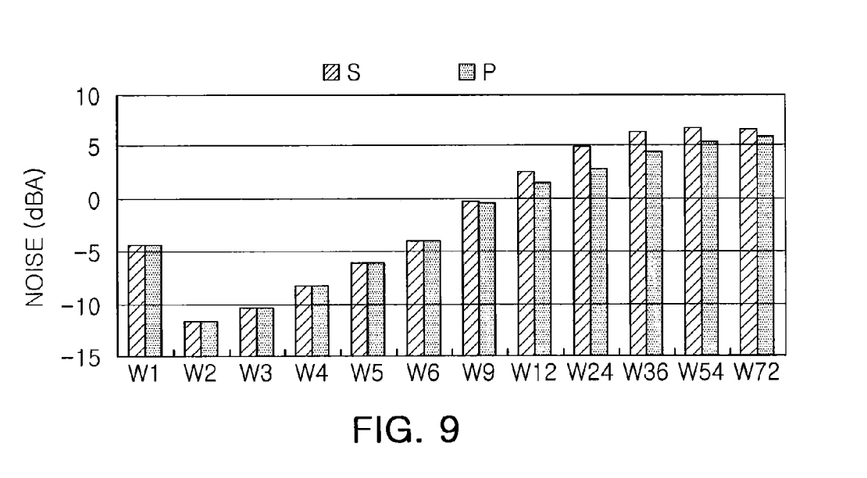
FIG. 9 is a graph describing noise generated by the stator core according to the embodiment of the present invention and a stator core in which a through-hole is not closed.

FIG. 7 is a graph comparing a torque constant of the stator core according to the embodiment of the present invention with torque constants of the stator cores according to the related art. FIG. 8 is a graph describing a change in cogging torque according to a ratio of a diameter of a through-hole included in the stator core according to the embodiment of the present invention to an interval between extension parts of the stator core. FIG. 9 is a graph describing noise generated by the stator core according to the embodiment of the present invention and a stator core in which a through-hole is not closed.

First, effects of the stator core according to the embodiment of the present invention will be described with reference to FIG. 6.

Meanwhile, a vertical axis of FIG. 6 indicates a magnitude of cogging torque. In addition, X of a horizontal axis indicates the stator core according to the related art, that is, the stator core (See FIG. 1) that does not have a configuration for reducing cogging torque. Further, Y of the horizontal axis indicates the stator core according to the related art, that is, the stator core (See FIG. 2) having grooves in the front ends thereof in order to reduce cogging torque. Further, Z of the horizontal axis indicates the stator core according to the embodiment of the present invention.

It could be appreciated from FIG. 6 that Z, the stator core according to the embodiment of the present invention, has reduced cogging torque as compared to X and Y, the stator cores according to the related art.

Meanwhile, a vertical axis of FIG. 7 indicates a torque constant, that is, a torque constant indicating a magnitude of rotational driving force.

In addition, a horizontal axis of FIG. 7 indicates X, Y, and Y the same as those of the horizontal axis of FIG. 6.

It could be appreciated from FIG. 7 that Z, the stator core according to the embodiment of the present invention, has a torque constant larger than that of Y, the stator core according to the related art. That is, it could be appreciated that Z may generate rotational driving force larger than that of Y.

In addition, it could be appreciated that Z, the stator core according to the embodiment of the present invention, has a torque constant lower than that of X, the stator core according to the related art, but similar to that of X as compared to Y.

It could be appreciated from FIGS. 6 and 7 that Z, the stator core according to the embodiment of the present invention, may alleviate a reduction in magnitude of the rotational driving force while reducing cogging torque.

In addition, referring to FIG. 8, a vertical axis indicates cogging torque, and a horizontal axis indicates a ratio of the diameter "d" of the through-hole to the interval "a" between the extension parts of the stator core.

It may be appreciated from FIG. 8 that cogging torque is rapidly reduced in the case that the range of the ratio (d:a) of the diameter "d" of the through-hole to the interval "a" between the extension parts of the stator core is between 0.5 and 1.

Further, it could be appreciated that cogging torque is more significantly reduced in the case that the range of the ratio (d:a) of the diameter "d" of the through-hole to the interval "a" between the extension parts of the stator core is 0.75.

Therefore, when the ratio (d:a) of the diameter "d" of the through-hole to the interval "a" between the extension parts of the stator core is 0.75, a cogging torque reduction rate of may be maximized while the reduction in the torque constant (that is, the rotational driving force) is alleviated.

Furthermore, referring to FIG. 9, S indicates a stator core including a through-hole formed in an extension part and having both opened sides, and P indicates a stator core including a through-hole formed in an extension part and having one closed side, that is, the stator core according to the embodiment of the present invention.

It could be appreciated from FIG. 9 that in the case of the stator core according to the embodiment of the present invention, since one side of the through-hole is closed, the air does not pass and flow through the through-hole, such that the generation of the noise is reduced.

As described above, the through-holes 250 are formed in the extension parts 240, whereby cogging torque generated at the time of rotation of the magnet 116 may be reduced.

In addition, since the through-holes 250 are formed in the extension parts 240, the gaps formed by the inner peripheral surface of the magnet 116 and the front edges of the extension parts 240 are constant, whereby the noise generated due to the irregular air flow may be reduced.

Further, since the ratio (d:a) of the diameter "d" of the through-hole 250 to the interval "a" between the extension parts is 0.5 to 1, cogging torque may be further reduced.

Furthermore, one side of the through-hole 250 is closed, whereby the generation of the noise caused by the air flow generated at the time of the rotation of the magnet 116 may be further reduced.

Hereinafter, a stator core according to another embodiment of the present invention will be described with reference to the accompanying drawing. However, a detailed description of the same components as the above-mentioned components will be omitted and be replaced by the above-mentioned description.

Figure 10:
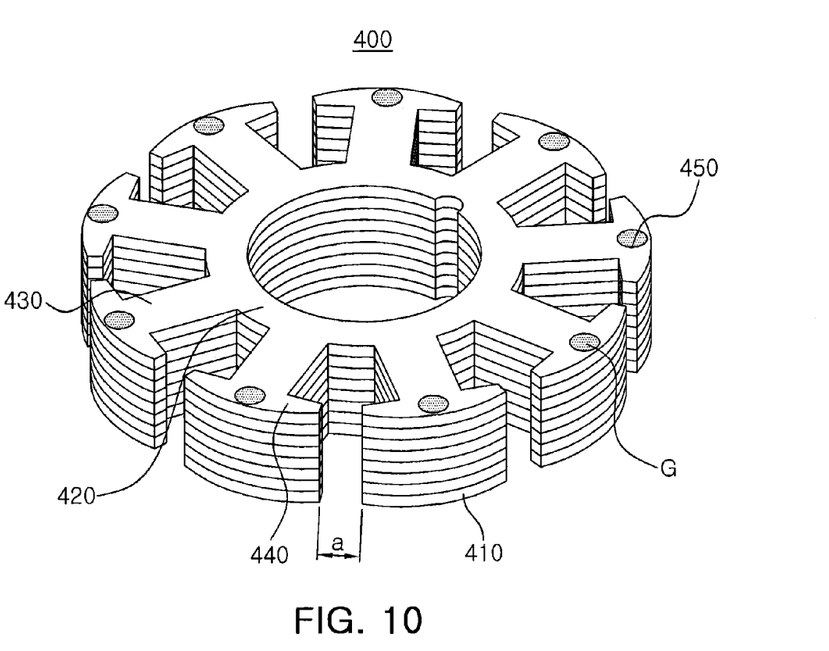
FIG. 10 is a perspective view showing a stator core according to another embodiment of the present invention.

FIG. 10 is a perspective view showing a stator core according to another embodiment of the present invention.

Referring to FIG. 10, a stator core 400 according to another embodiment of the present invention may be formed by stacking a plurality of single core sheets 410, and at least one of the plurality of single core sheets 410 may includes through-holes 450 formed therein in order to reduce cogging torque.

Meanwhile, each of the single core sheets 410 may include a coreback 420, tooth parts 430, and extension parts 440.

In addition, the through-holes 450 may be formed in all of the plurality of single core sheets 410 and may be filled with a filler G to be closed. In addition, the filler G may be an acrylic bond or an epoxy-based bond.

Remaining components are the same as those of the stator core 200 according to the foregoing embodiment of the present invention described above. Therefore, a detailed description thereof will be omitted.

As described above, since the through-hole 450 may be closed by being filled with the filler G, the air flowing at the time of the rotation of the magnet 116 (See FIG. 1) does not pass through the through-hole 450, whereby noise and vibrations generated by the air passing through the through-hole 450 may be reduced.

As set forth above, cogging torque may be reduced through the through-holes formed in the extension parts.

In addition, the through-holes are formed in the extension parts, whereby noise caused by an irregular air flow generated at the time of the rotation of the magnet may be reduced.

Further, the air is not allowed to pass and flow through the through-hole at the time of the rotation of the magnet, whereby the generation of noise and vibrations due to the air passing though the through-hole may be reduced.

While the present invention has been shown and described in connection with the embodiments, it will be apparent to those skilled in the art that modifications and variations can be made without departing from the spirit and scope of the invention as defined by the appended claims.

What is claimed is:

1. A stator core, comprising:
a plurality of stacked single core sheets, each single core sheet including a coreback having a central hole formed therein, a plurality of tooth parts extended from the coreback in a radial direction, and extension parts extended from the plurality of respective tooth parts in a circumferential direction,
wherein at least one of the plurality of single core sheets includes through-holes formed therein in order to reduce cogging torque, the through-holes being formed in the extension parts and being closed at one end, and
wherein, among the plurality of single core sheets, an uppermost single core sheet closes the through-holes formed in the remainder single core sheets stacked therebelow.

2. The stator core of claim 1, wherein the through-holes are formed in an axial direction in order to reduce cogging torque.

3. The stator core of claim 1, wherein each through-hole has a circular shape, and a ratio of a diameter of each through-hole to an interval between the extension parts is within a range of 0.5~1:1.

4. A spindle motor comprising:

a rotor part including a rotor hub having a magnet mounted on an inner surface thereof; and a stator part rotatably supporting the rotor part and including a stator core disposed to face the magnet, wherein the stator core is formed by stacking a plurality of single core sheets, each single core sheet including a coreback having a central hole formed therein, a plurality of tooth parts extended from the coreback in a radial direction, and extension parts extended from the plurality of respective tooth parts in a circumferential direction, and at least one of the plurality of single core sheets includes through-holes formed therein in order to reduce cogging torque, the through-holes being formed in the extension parts and being closed at one end, and among the plurality of single core sheets, an uppermost single core sheet closes the through-holes formed in the remainder single core sheets stacked therebelow.

5. The spindle motor of claim 4, wherein the through-holes are formed in an axial direction in order to reduce cogging torque.

6. The spindle motor of claim 4, wherein each through-hole has a circular shape, and a ratio of a diameter of each through-hole to an interval between the extension parts is within a range of 0.5~1:1.

7. The spindle motor of claim 4, wherein the stator part further includes:

a base member including an installing part having the stator core mounted thereon; and a sleeve fixed to the installing part, and the stator core is fixed to an outer peripheral surface of the installing part in order that front edges of the extension parts are disposed to face the magnet.

8. The spindle motor of claim 7, wherein the rotor part further includes a shaft rotatably inserted into the sleeve and having the rotor hub mounted on an upper end portion thereof to thereby rotate together therewith, and the through-hole is formed to be parallel with the shaft.

9. The spindle motor of claim 4, wherein the through-holes are disposed on extension lines extended from the plurality of tooth parts, and formed in the extension parts.

\* \* \* \* \*

UNITED STATES PATENT AND TRADEMARK OFFICE
CERTIFICATE OF CORRECTION

| | | |
|---|---|---|
| PATENT NO. | : 8,912,703 B2 | Page 1 of 1 |
| APPLICATION NO. | : 13/442362 | |
| DATED | : December 16, 2014 | |
| INVENTOR(S) | : Song Bon Oh et al. | |

It is certified that error appears in the above-identified patent and that said Letters Patent is hereby corrected as shown below:

In the Claims

Column 9, line 12, after "circumferential direction," delete "and".

Signed and Sealed this
Second Day of June, 2015

Michelle K. Lee
*Director of the United States Patent and Trademark Office*